United States Patent
Starns et al.

(10) Patent No.: US 9,212,715 B2
(45) Date of Patent: Dec. 15, 2015

(54) TUNABLE VIBRATION DAMPERS

(71) Applicant: Google Inc., Mountain View, CA (US)

(72) Inventors: Alexander Thomas Starns, Redwood City, CA (US); Matthew Thomas Valente, Mountain View, CA (US); Iain Richard Tyrone McClatchie, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/395,723

(22) PCT Filed: Jun. 20, 2013

(86) PCT No.: PCT/US2013/046698
§ 371 (c)(1),
(2) Date: Oct. 20, 2014

(87) PCT Pub. No.: WO2013/192370
PCT Pub. Date: Dec. 27, 2013

(65) Prior Publication Data
US 2015/0131982 A1    May 14, 2015

Related U.S. Application Data

(60) Provisional application No. 61/662,509, filed on Jun. 21, 2012.

(51) Int. Cl.
| | |
|---|---|
| *G03B 39/00* | (2006.01) |
| *F16F 3/087* | (2006.01) |
| *F16F 7/108* | (2006.01) |
| *G03B 15/00* | (2006.01) |

(52) U.S. Cl.
CPC ............. *F16F 3/0876* (2013.01); *F16F 7/108* (2013.01); *G03B 15/006* (2013.01)

(58) Field of Classification Search
USPC ................................................ 396/7; 248/638
See application file for complete search history.

(56) References Cited

U.S. PATENT DOCUMENTS

| | | | | |
|---|---|---|---|---|
| 2,486,741 | A | * | 11/1949 | Gabriel ......................... 267/293 |
| 2,724,588 | A | | 11/1955 | Sheets |
| 3,515,382 | A | | 6/1970 | Gallagher |
| 4,050,665 | A | * | 9/1977 | Matthews et al. ............. 248/638 |
| 5,286,013 | A | | 2/1994 | Seymour et al. |
| 5,339,580 | A | | 8/1994 | Koshika et al. |

OTHER PUBLICATIONS

International Search Report, mailed Dec. 23, 2013—2 pages.

(Continued)

*Primary Examiner* — Clayton E Laballe
*Assistant Examiner* — Dennis Hancock
(74) *Attorney, Agent, or Firm* — Dority & Manning, P.A.

(57) ABSTRACT

In one aspect, a tunable vibration damper may include a housing and a damper stack disposed within the housing. The damper stack may be formed from a viscoelastic material and may have a vertical stiffness and a horizontal stiffness. The damper stack may also include a plurality of column sections and a plurality of disk sections, with each pair of adjacent column sections being separated by one of the disk sections. The disk sections may extend radially outwardly relative to the column sections. In addition, at least one of the vertical stiffness or the horizontal stiffness may be tunable by adjusting a stiffness-related parameter of the damper stack.

18 Claims, 14 Drawing Sheets

(56) References Cited

OTHER PUBLICATIONS

Petrie et al., "Airborne Digital Imaging Technology: A New Overview", The Photogrammetric Record, vol. 22, No. 119, Sep. 2007, pp. 203-225.

www.caribul.com/product_lang-1-pid-76.html—1 page.

Caribul S.r.l., "Special Oilproof Rubber Vibration Dampers Suitable to Suspend Ventilation and Exhaust Gas Ducts System" www.caribul.com—1 page.

Flow Engineering "Damper Systems", www.flow-engineering.com/page.php?pageID-254—1 page.

Antishock—Antivibration for Presses www.caribul.com/product_lang1-1-pid-67—1 page.

\* cited by examiner

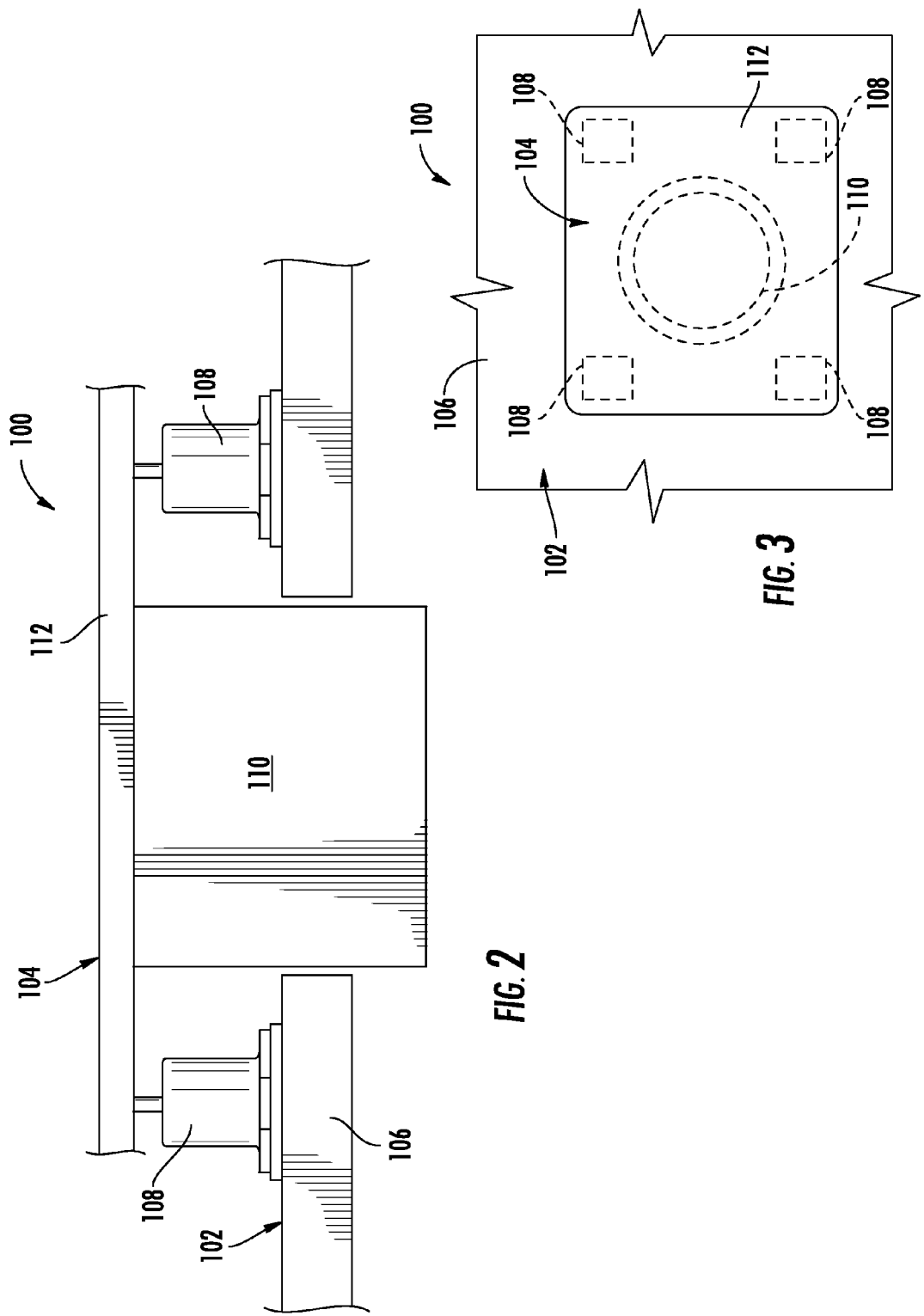

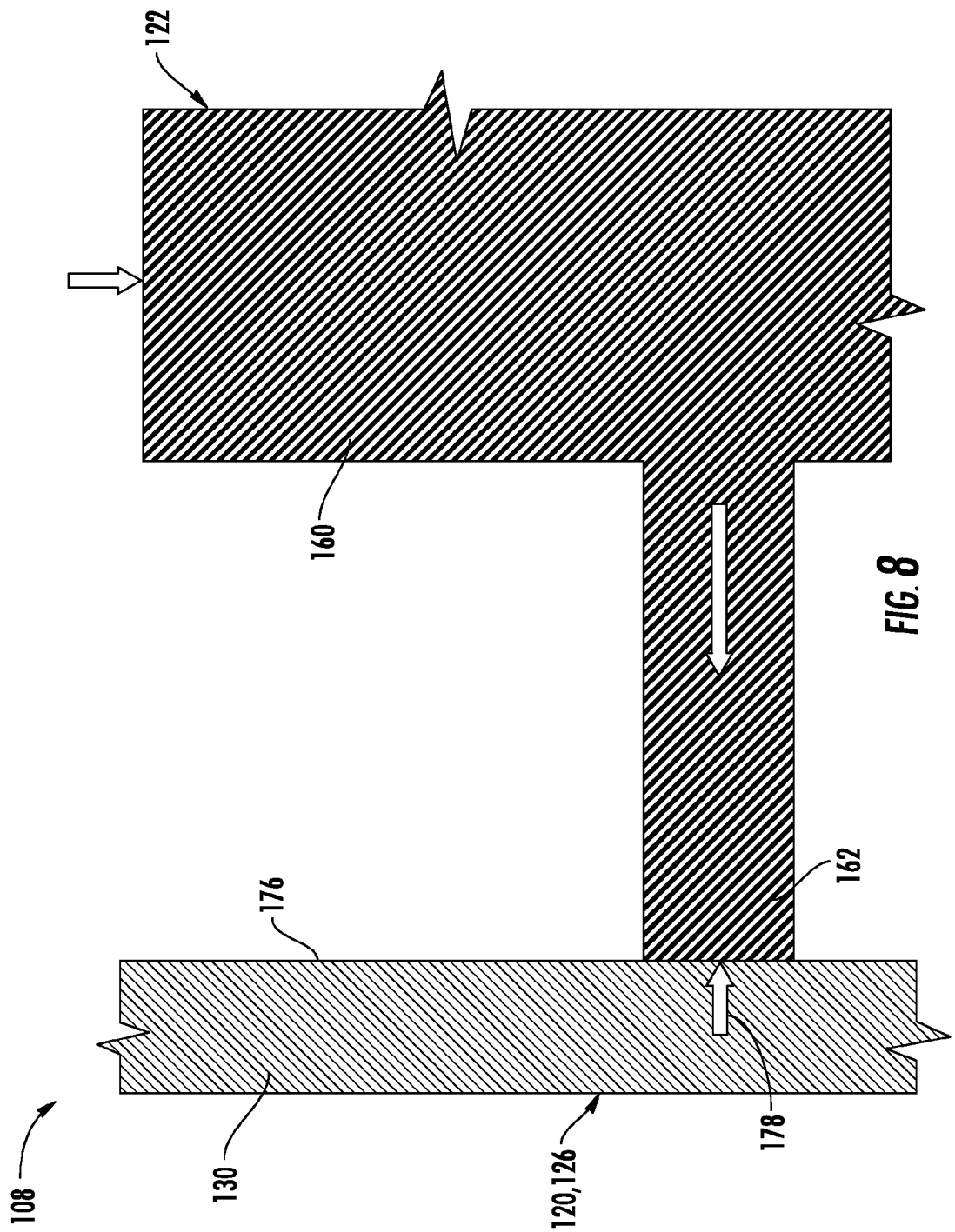

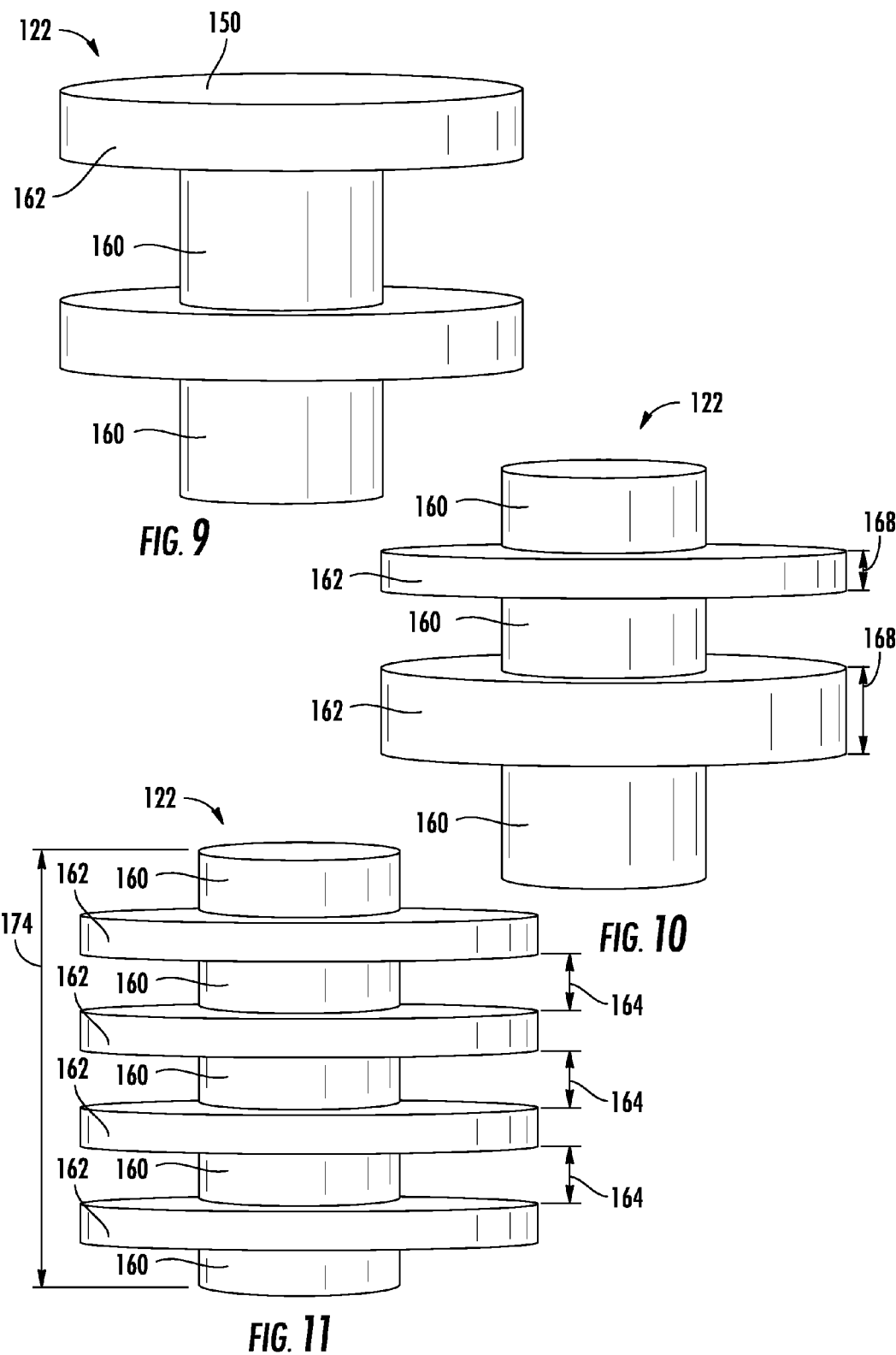

TUNABLE VIBRATION DAMPERS

CROSS-REFERENCE TO RELATED APPLICATIONS

This application is based upon and claims priority to U.S. Provisional Patent Application No. 61/662,509, filed Jun. 21, 2012 and entitled "Tunable Aerial Vibration Damper," the disclosure of which is hereby incorporated by reference herein in its entirety for all purposes.

FIELD

The present subject matter relates generally to payload/damper systems for isolating vibrations and, more particularly, to tunable vibration dampers that may be used to tailor the natural frequency of a payload/damper system to match the specific requirements of the system.

BACKGROUND

Passive vibration isolation mounts (also referred to herein as payload/damper systems) typically include one or more vibration dampers configured to isolate a payload from a vibration source. While such passive systems are well known in the art, it is often quite difficult to design a system to isolate payloads from a vibration source having a vibration spectrum with peaks at low frequencies. For instance, payload/damper systems are used to isolate vibration-sensitive equipment (e.g., camera(s) and/or other sensors) within an airplane, which may have input frequencies as low as about 30 Hz (or even lower). As a result, to properly isolate the aerial equipment from vibrations, the natural frequency of the payload/damper system must be significantly lower than 30 Hz. Unfortunately, to provide a system with such a low natural frequency, the vibration dampers are typically quite expensive and must be rather large. In addition, while the vibration dampers utilized within such systems often provide the required vertical vibration isolation characteristics, the dampers are not capable of sufficiently isolating the system from horizontal vibrations.

SUMMARY

Aspects and advantages of the invention will be set forth in part in the following description, or may be obvious from the description, or may be learned through practice of the invention.

In one aspect, the present subject matter is directed to a tunable vibration damper. The vibration damper may include a housing and a damper stack disposed within the housing. The damper stack may be formed from a viscoelastic material and may have a vertical stiffness and a horizontal stiffness. The damper stack may also include a plurality of column sections and a plurality of disk sections, with each pair of adjacent column sections being separated by one of the disk sections. The disk sections may extend radially outwardly relative to the column sections. In addition, at least one of the vertical stiffness or the horizontal stiffness may be tunable by adjusting a stiffness-related parameter of the damper stack.

In another aspect, the present subject matter is directed to a system for damping vibrations derived from a vibration source. The system may include a payload and at least one vibration damper coupled between the payload and the vibration source. The vibration damper may include a housing and a damper stack disposed within the housing. The damper stack may be formed from a viscoelastic material and may have a vertical stiffness and a horizontal stiffness. The damper stack may also include a plurality of column sections and a plurality of disk sections, with each pair of adjacent column sections being separated by one of the disk sections. The disk sections may extend radially outwardly relative to the column sections. In addition, at least one of the vertical stiffness or the horizontal stiffness may be tunable by adjusting a stiffness-related parameter of the damper stack.

In a further aspect, the present subject matter is directed to a system for capturing aerial photography from an airplane. The system may include a camera and at least one vibration damper coupled between the payload and a component of the airplane. The vibration damper may include a housing and a damper stack disposed within the housing. The damper stack may be formed from a viscoelastic material and may have a vertical stiffness and a horizontal stiffness. The damper stack may also include a plurality of column sections and a plurality of disk sections, with each pair of adjacent column sections being separated by one of the disk sections. The disk sections may extend radially outwardly relative to the column sections. In addition, at least one of the vertical stiffness or the horizontal stiffness may be tunable by adjusting a stiffness-related parameter of the damper stack.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 2 illustrates a simplified, side view of one embodiment of a system for isolating vibrations derived from a vibration source in accordance with aspects of the present subject matter;

FIG. 3 illustrates a top view of the system shown in FIG. 2;

FIG. 8 illustrates a partial, cross-sectional view of the vibration damper shown in FIG. 6, particularly illustrating a damper stack of the vibration damper being loaded or compressed;

FIG. 9 illustrates a side perspective view of another embodiment of a damper stack configuration in accordance with aspects of the present subject matter;

FIG. 10 illustrates a side perspective view of a further embodiment of a damper stack configuration in accordance with aspects of the present subject matter;

FIG. 11 illustrates a side perspective view of yet another embodiment of a damper stack configuration in accordance with aspects of the present subject matter;

DETAILED DESCRIPTION

Figure 1:
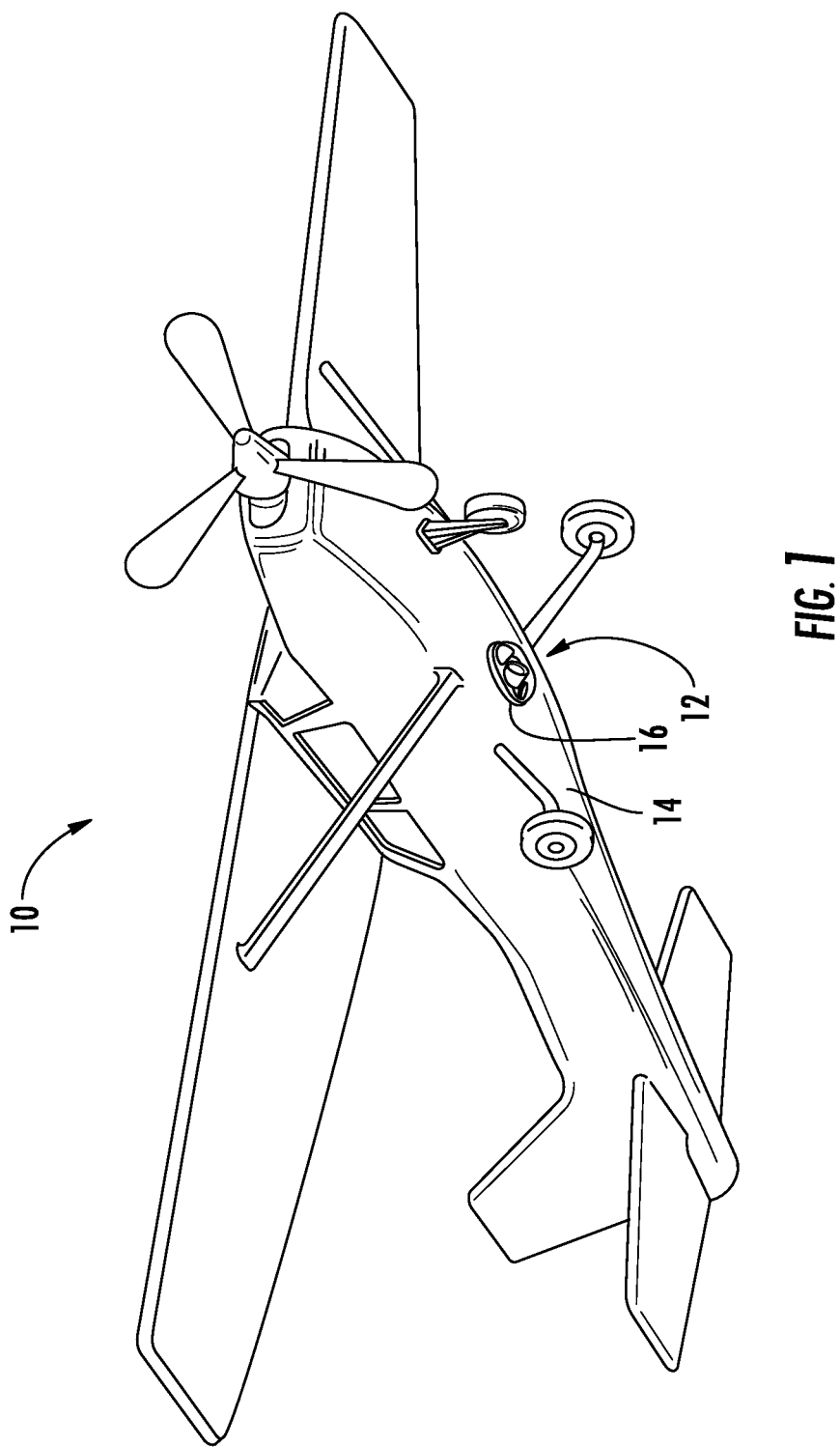
FIG. 1 illustrates a perspective view of one embodiment of a suitable environment within which the disclosed system may be advantageously used in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a passive system for isolating vibrations derived from a vibration source. Specifically, the present subject matter discloses a tunable vibration damper that may be utilized to fine-tune the natural frequency(ies) of a payload/damper system. In several embodiments, the vibration damper may include a viscoelastic damper stack that includes alternating column and disk sections. As will be described below, by adjusting one or more stiffness-related parameters of the column and/or disk sections, the stiffness of the damper stack in each direction may be independently tuned to optimize the damping characteristics of the vibration damper. For instance, a vertical stiffness of the damper stack (e.g., along the z-axis) may be tuned independent of the horizontal stiffness of the damper stack. Similarly, the horizontal stiffness of the damper stack in one direction (e.g., along the x-axis) may be tuned independent of the horizontal stiffness of the stack in a different horizontal direction (e.g., along the y-axis). Accordingly, by determining the various input frequencies (including their directional components) derived from a vibration source, the stiffness of the damper stack may be specifically tailored to provide optimal damping for the system.

In several embodiments, the present subject matter will be described with reference to isolating sensitive equipment (e.g., camera(s) and/or other sensors) from the lower frequency vibrations of an aircraft, such as a piston or turbo-prop driven airplane. However, it should be appreciated that the disclosed vibration dampers may generally be utilized with any suitable payload/damper system to provide enhanced damping for the system.

Referring now to the drawings, FIG. 1 illustrates one embodiment of a suitable environment within which the disclosed system may be advantageously used. As shown, an airplane 10 may be configured for capturing aerial photography by including at least one camera 12 mounted to and/or within a fuselage 14 of the airplane. Specifically, in several embodiments, the camera 12 may be mounted in and/or extend through an opening 16 defined in a bottom portion of the fuselage 14. Thus, the field of view of the camera 12 may be directed downward, thereby allowing the camera 12 to capture images of the environment positioned below the airplane 10.

In general, the camera 12 may be any suitable camera known in the art. For example, the camera 12 may be a digital camera, such as a digital still-image camera or a digital video camera. In several embodiments, the camera 12 may be specifically configured for capturing aerial photography. For instance, in one embodiment, the camera 12 may be a linear array camera (also referred to as a linear array scanner or pushbroom camera). In another embodiment, the camera 12 may include a plurality of individual cameras positioned at different orientations relative to one another in order to capture various views (e.g., a nadir and/or an oblique view) of the environment located below the airplane 10.

When capturing aerial photography, the performance of the camera 12 may often be impacted by the vibrations generated by the engine(s) and/or other components of the airplane 10. Specifically, vibrations transmitted from the airplane 10 (e.g., through the fuselage 14) may not only cause damage to the camera, itself, but may also negatively affect the quality of the images captured by the camera 12. As will be described below, by utilizing the disclosed vibration dampers, a payload/damper system may be designed to isolate the camera 12 from the low frequency vibrations of the airplane 10, thereby preventing damage to the camera 12 and also allowing for the quality of the images captured by the camera 12 to be significantly improved.

It should be appreciated that the airplane 10 shown in FIG. 1 is merely illustrated to provide one example of an exemplary setting within which the disclosed system may be advantageously used. Thus, one of ordinary skill in the art should readily appreciate that the present subject matter need not be limited to aerial photography applications but may generally be utilized in any application in which it is desired to isolate a payload from vibrations derived from a vibration source.

Referring now to FIGS. 2 and 3, one embodiment of a system 100 for isolating vibrations derived from a vibration source 102 is illustrated in accordance with aspects of the present subject matter. Specifically, FIG. 2 illustrates a simplified, side view of the system 100 and a FIG. 3 illustrates a top view of the system 100.

As shown, the system 100 may generally include a payload 104 coupled to a component 106 of the vibration source 102 via one or more tunable vibration dampers 108. As used herein, the term "payload" refers to any object and/or combination of objects that may be isolated from the vibration source 102 using the vibration dampers 108. In several embodiments, the payload 104 may be one or more types of vibration-sensitive equipment. For instance, as shown in the illustrated embodiment, the payload 104 includes a camera 110 and a camera base 112 coupled between the camera 110 and the vibration dampers 108. The camera 110 may be, for example, a camera configured to capture aerial photography (e.g., camera 12) or any other suitable camera desired to be vibrationally isolated from the vibration source 102. In other embodiment, the payload 104 may be any other suitable vibration-sensitive sensors, devices and/or other objects Additionally, the vibration source 102 may generally correspond to any suitable machine, device and/or other object that generates environmental noise in the form of one or more input frequencies that can lead to vibrations being transmitted to the payload 104. In several embodiments, the vibration source 102 may be a vehicle having an engine(s) and/or any other suitable component(s) that contribute to the generation of one or more input frequencies. For example, in one embodiment, the vibration source 102 may be an airplane (e.g., airplane 10). In such an embodiment, the component 106 may correspond to any suitable component of the airplane, such as the fuselage 14 of the airplane 10 (FIG. 1) or any other component coupled to and/or supported by the fuselage 14. It should be appreciated that, in alternative embodiments, the vibration source 102 may be a non-vehicle-related source of vibrations.

As indicated above, the payload 104 may be coupled to the vibration source 102 using one or more tunable vibration dampers 108. For example, as shown in the illustrated embodiment, the payload 104 is coupled to the vibration source 102 using four vibration dampers 108, such as by positioning a vibration damper 108 at each corner of the camera base 112. However, in other embodiments, the system 100 may include any other number of vibration dampers 108 coupled between the payload 104 and the vibration source 102, with such vibration dampers 108 may be arranged between such components in any suitable manner that permits the dampers 108 to function as described herein.

It should be appreciated that a given vibration source 102 may have a vibration spectrum including a plurality of different resonant or input frequencies. For instance, as indicated above, airplanes may have a minimum input frequency at or around 30 Hz. However, airplanes may also have input frequencies around 75 to 100 Hz and/or around 200 to 300 Hz. Thus, when designing a payload/damper system 100, the input frequencies included within the entire vibration spectrum may need to be considered.

Additionally, one of ordinary skill in the art should readily appreciate that the amplitude of the vibration transmitted through a damper/payload system 100 may depend significantly on the natural frequency of the system, which may be represented by the following equation (Equation 1):

$$f_n = \sqrt{\frac{k}{m}} \quad (1)$$

whereas, $f_n$ corresponds to the natural frequency of the payload/damper system 100 along a particular axis, k corresponds to the spring rate or stiffness of the vibration damper(s) 108 along the particular axis and m corresponds to the mass of the payload 104.

Figure 4:
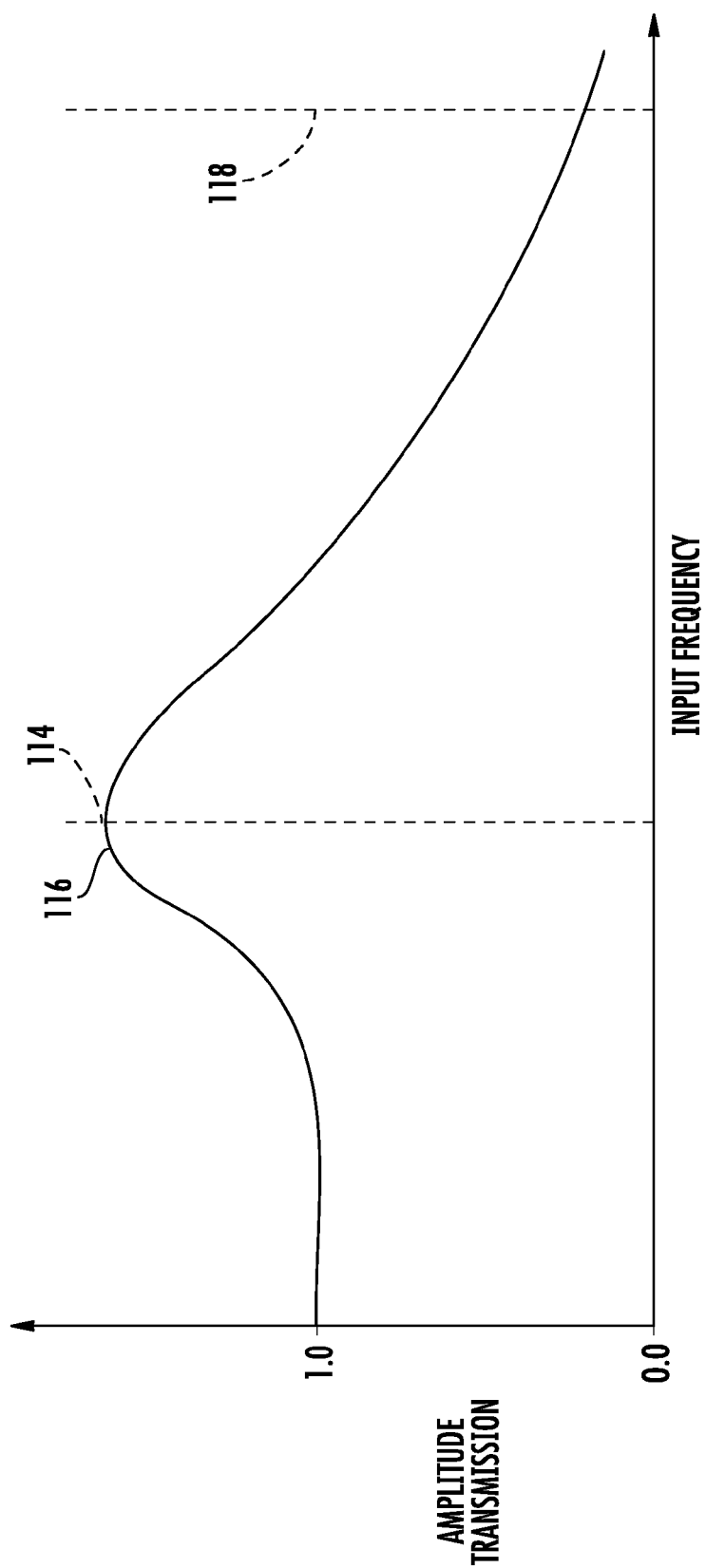
FIG. 4 illustrates a graphical representation of one example of the relationship between the natural frequency of a damper/payload system and the amplitude of the vibration transmitted from a vibration source, with the input frequency of the vibration source being charted on the x-axis and the amplitude of the vibration transmitted through the system being charted on the y-axis.

An example of the relationship between the natural frequency of a damper/payload system 100 and the magnitude of the vibration transmitted from the vibration source 102 is provided in FIG. 4, which charts the amplitude of the vibration transmitted through the system (y-axis) versus the input frequency of the vibration source 102 (x-axis). As shown, essentially all the vibration derived from the vibration source 102 is transmitted through the damper/payload system 100 at input frequencies below the natural frequency of the system (indicated by line 114). Additionally, at input frequencies around the natural frequency 114, the vibration transmitted through the system is significantly amplified (i.e., indicated by the peak 116 in the transmission curve). However, as the input frequency increases above the natural frequency 114, the amplitude transmitted decreases significantly (e.g., approximately or linearly as the square of the ratio between the input and natural frequencies).

Thus, it may be desirable to design the damper/payload system 100 to have a natural frequency that is lower than the minimum input frequency of the vibration source 102, thereby ensuring that the peak 116 of the transmission curve is positioned to the left of such input frequency. For instance, in the example shown in FIG. 4, it may be assumed that the minimum input frequency of a given vibration source 102 is indicated by line 118. By designing the damper/payload system 100 such that the natural frequency is significantly lower than such input frequency 118 (e.g., by having a natural frequency at line 114), the amount of vibration transmitted from the vibration source 102 to the payload 104 may be minimal. As will be described below, such tailoring of the natural frequency of the system 100 may be achieved by tuning the stiffness of the disclosed vibration dampers 108.

Figure 5:
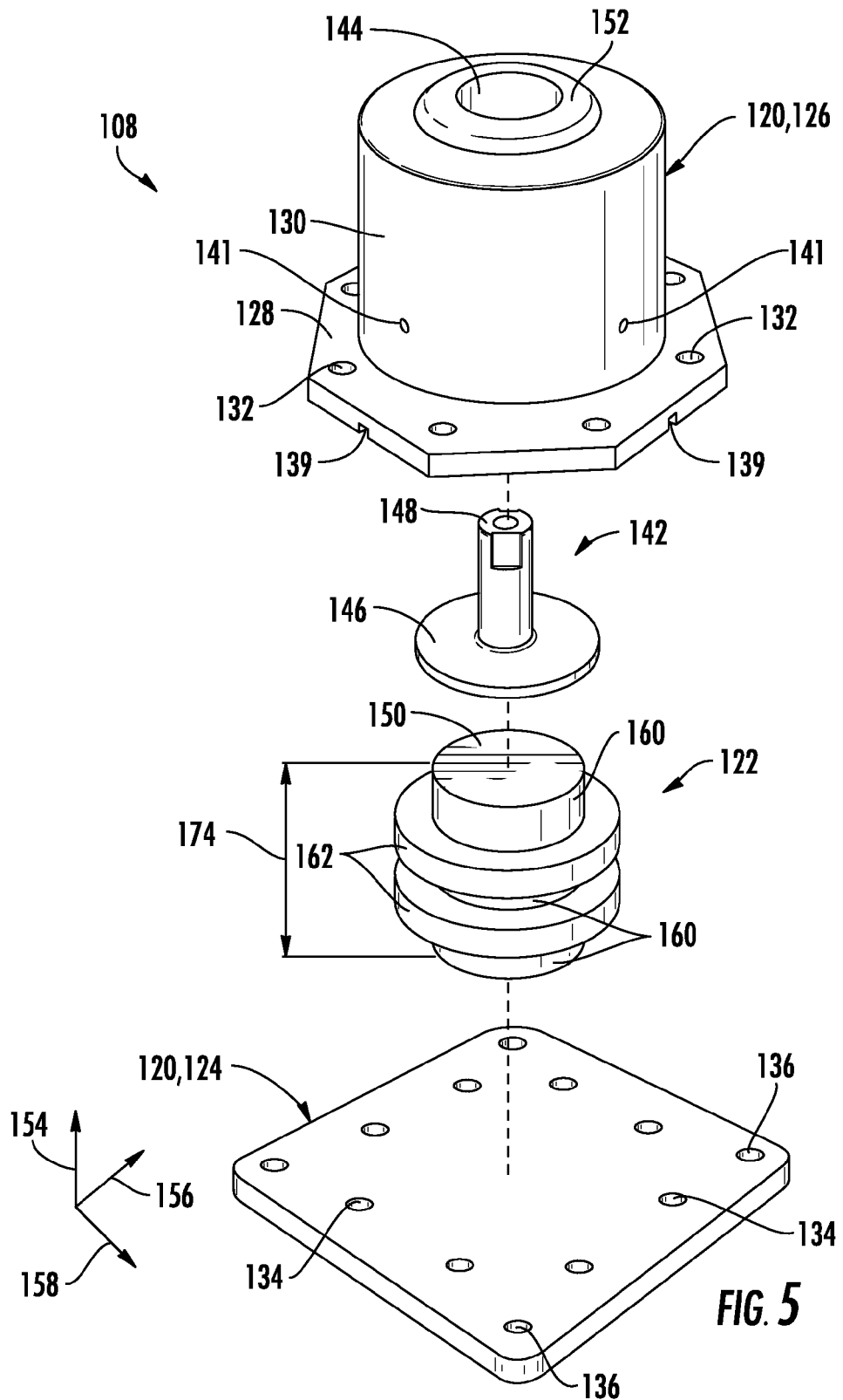
FIG. 5 illustrates an exploded view of one embodiment of one of the vibration dampers shown in FIGS. 2 and 3.
Figure 6:
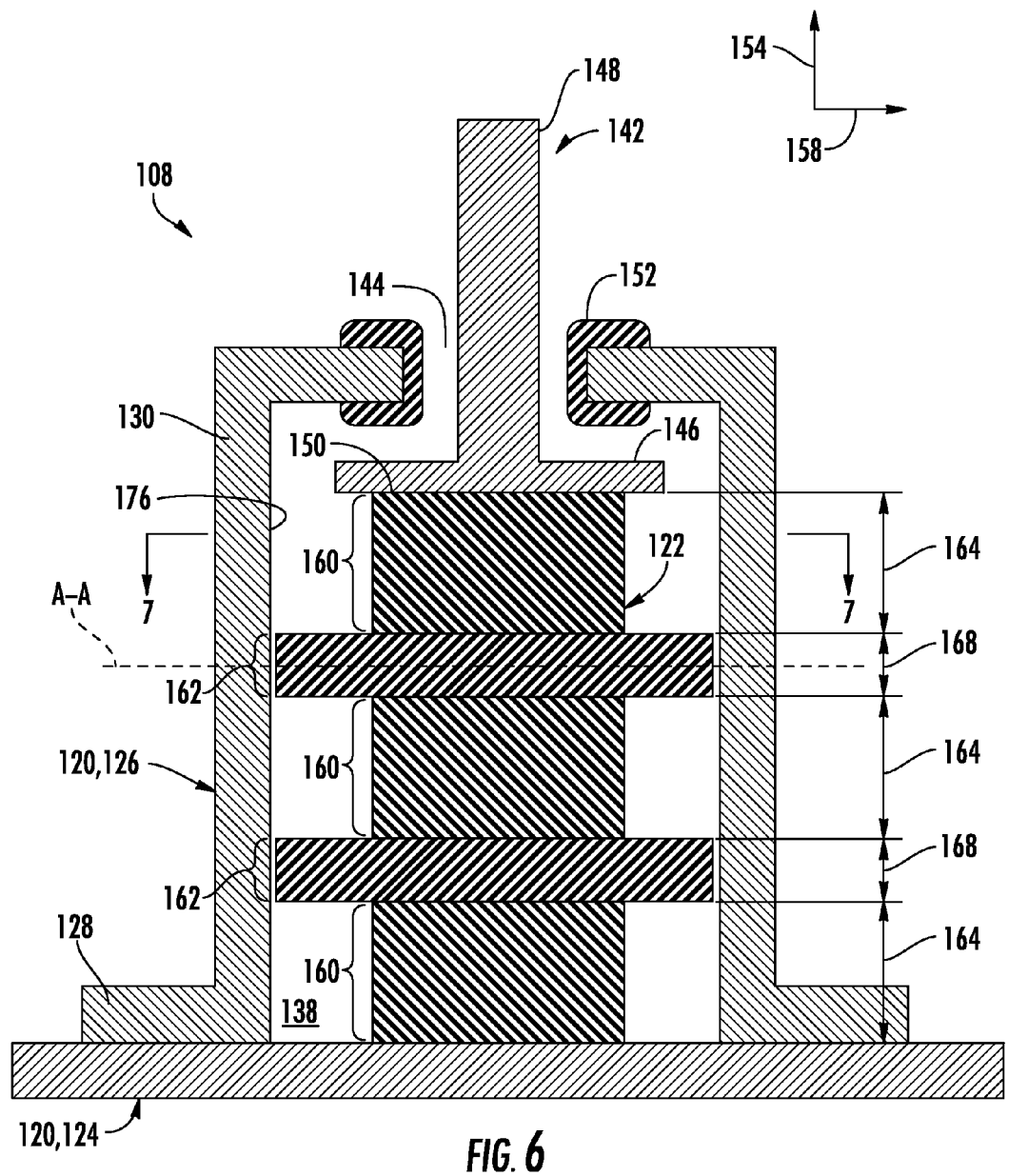
FIG. 6 illustrates an assembled, vertical cross-sectional view of the vibration damper shown in FIG. 5.
Figure 7:
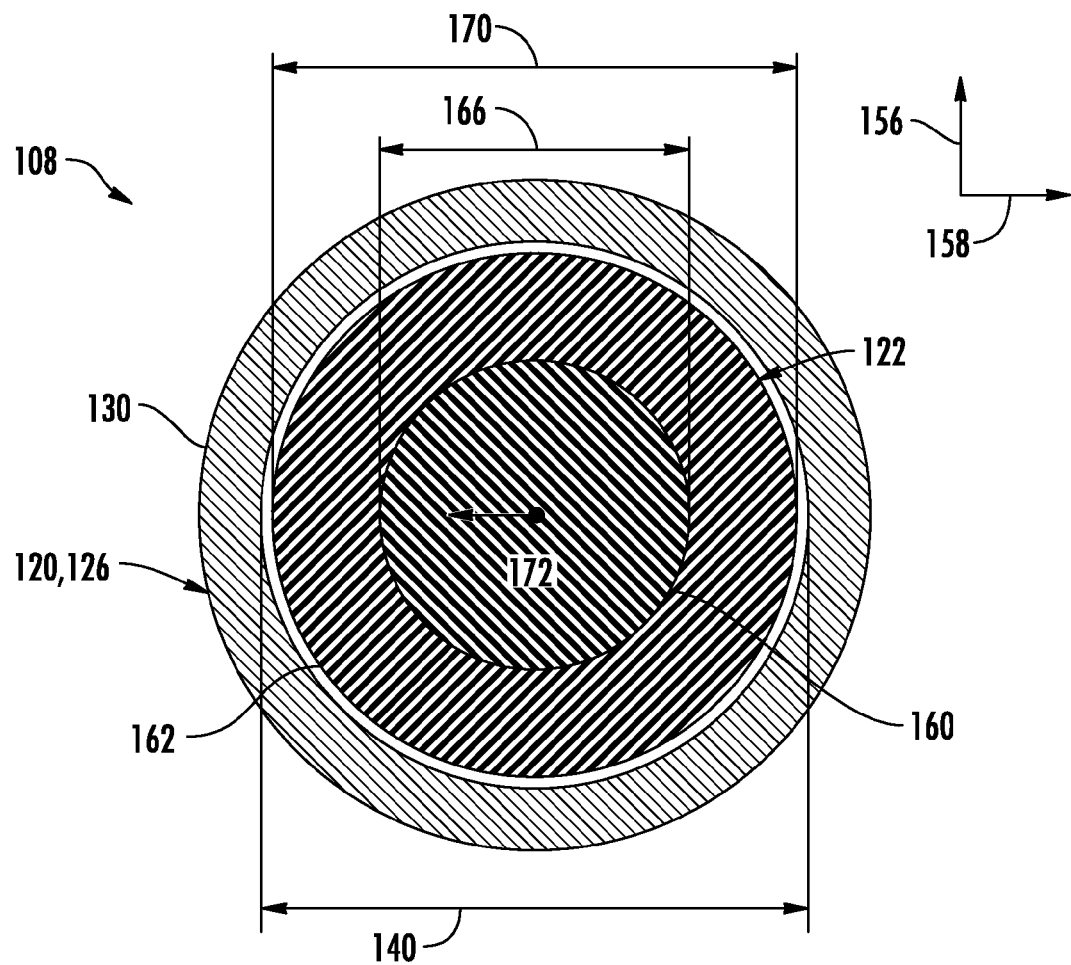
FIG. 7 illustrates a horizontal cross-sectional view of the vibration damper shown in FIG. 6 taken about line 7-7.

Referring now to FIGS. 5-7, one embodiment of one of the tunable vibration dampers 108 shown in FIGS. 2 and 3 is illustrated in accordance with aspects of the present subject matter. Specifically, FIG. 5 illustrates an exploded view of the vibration damper 108. FIG. 6 illustrates an assembled, vertical cross-sectional view of the vibration damper 108 shown in FIG. 5 and FIG. 7 illustrates a horizontal cross-sectional view of the vibration damper shown in FIG. 6 taken about line 7-7.

As shown, the vibration damper 108 includes a housing 120 and a damper stack 122 configured to be disposed within the housing 120. In general, the housing 120 may have any suitable configuration and/or may include any suitable components that allow the damper stack 122 to be enclosed therein. For example, in several embodiments, the housing 120 may include a base 124 and a cover 126 configured to be coupled to the base 124. As shown in FIG. 5, the cover 126 may include a flange portion 128 and a cylindrical portion 130. The flange portion 128 may generally be configured to extend radially outwardly from the cylindrical portion 130 and may define one or more flange openings 132. The flange opening(s) 132 may be configured to be aligned with corresponding base openings 134 defined in the base 124 to allow the base 124 and the cover 126 to be coupled to one another (e.g., using suitable mechanical fasteners). In addition, the base 124 may also define one or more openings 136 configured to receive suitable fasteners for coupling the base 124 to the vibration source (e.g., to the component 106 of the vibration source 102).

The cylindrical portion 130 may generally be configured to surround or encase the damper stack 122 when the cover 126 is coupled to the base 124. Specifically, in several embodiments, the cylindrical portion 130 may define a cylindrically shaped, open volume 138 (FIG. 6) configured to receive the damper stack 122. For instance, in one embodiment, an inner diameter 140 (FIG. 7) of the cylindrical portion 130 may be slightly larger than an unloaded, outer diameter of the damper stack 122. Thus, when the damper stack 122 is positioned on the base 124, the cover 126 may be installed over the damper stack 122 such that the stack 122 is received within the open volume 138 defined by the cylindrical portion 130. The flange portion 128 may then be coupled to the base 124 to fully encase the damper stack 122 within the housing 120.

Additionally, one or more air vents 139, 141 may be defined in the housing 120 to provide a means for discharging pressurized air from the housing 120. For example, as shown in FIG. 5, a first set of air vents 139 may be defined at the bottom of the flange portion 128 and a second set of air vents 141 may be defined through the cylindrical portion 130. By providing the air vents 139, 141, pressurized air may be released from the housing 120 to prevent such air from impacting the stiffness of the damper stack 122. It should be appreciated that the housing 120 may generally include any number of air vents 139, 141 defined at any suitable location on and/or within the housing 120. However, in several embodiments, it may be desirable for one or more of the air vents 139, 141 to be aligned heightwise between adjacent pairs of disk sections 162 such that pressurized air between the disk sections 162 may be released from the housing 120.

Moreover, the vibration damper 108 may also include a plunger 142 configured to be coupled to the payload 104. Specifically, the plunger 142 may serve as the interface between the payload 104 and the damper stack 122. Thus, as shown in FIG. 6, the plunger 142 may be configured to extend from the interior to the exterior of the housing 120 through a plunger opening 144 defining in the housing 120 (e.g., in the top of the cylindrical portion 130 of the housing 120). Specifically, a first end 146 of the plunger 142 may be configured to be in contact with and/or otherwise disposed adjacent to a top surface 150 of the damper stack 122 and a second end 148 of the plunger 142 may be configured to be extend outwardly from the housing 120. As such, the second end 148 of the plunger 142 may be coupled to the payload 104 (e.g., by coupling the second end 148 to the camera base 112 using suitable fasteners) to connect the vibration damper 108 to the payload 104. It should be appreciated that, in one embodiment, a suitable damping member 152 (e.g., a rubber gasket) may be installed around the inner circumferences of the plunger opening 144 to prevent the plunger 142 from directly contacting the housing 120.

It should be appreciated that the housing 120 described above and shown in FIGS. 5-7 is simply provided as one example of a suitable housing configuration for the disclosed vibration damper 108. Thus, one of ordinary skill in the art should appreciate that, in alternative embodiments, the housing 120 may have any other suitable configuration that allows the damper stack 122 to be fully or partially contained therein. For instance, in one embodiment, the housing 120 may be formed from a single component or three or more components.

Referring still to FIGS. 5-7, the damper stack 122 of the vibration damper 108 may generally serve as the means for attenuating the input frequencies generated by the vibration source 102. Specifically, as will be described below, one or more stiffness-related parameters of the damper stack 122 may be varied to adjust the stiffness of the damper 108 in one or more directions, thereby allowing the natural frequency of the payload/damper system 100 in such direction(s) to be tailored to the specific needs of the system 100. For example, the stiffness-related parameter(s) of the damper stack 122 may be selected to provide a specific vertical stiffness (i.e., along the z-axis 154 (FIGS. 5 and 6)) and/or a specific horizontal stiffness (i.e., along the y-axis 156 (FIGS. 5 and 6) and/or the x-axis 158 (FIGS. 5 and 6)) for the damper 108, which may, in turn, impact the vertical and/or horizontal natural frequencies of the payload/damper system 100. Thus, by knowing the input frequencies generated by the vibration source 102, the natural frequencies of the system 100 may be specifically tailored in manner that allows the payload 104 to be vibrationally isolated from the vibration source 102.

As shown in the illustrated embodiment, the damper stack 122 includes a plurality of column sections 160 and a plurality of disk sections 162, with the column and disk sections 160, 162 forming alternating rows such that each pair of adjacent column sections 160 is separated by one of the disk sections 162. As particularly shown in FIG. 6, in one embodiment, each column section 160 and disk section 162 may correspond to a separate component of the damper stack 122. In such an embodiment, the column and disk sections 160, 162 may be stacked one on top of the other to form the damper stack 122. Alternatively, the column and disk sections 160, 162 may be formed integrally with one another such that the damper stack 122 corresponds to a single-piece component (e.g., by molding the damper stack 122 as single component).

As shown in FIGS. 6 and 7, each column section 160 may define a height 164 and a diameter 166. Similarly, each disk section 162 may define a height 168 and a diameter 170. As particularly shown in FIG. 6, in several embodiments, the height 164 of each column section 160 may be greater than the height 168 of each disk section 162. In addition, the diameter 170 of each disk section 162 may be greater than the diameter 166 of each column section 160 such that the disk sections 162 extend radially outwardly relative to the column sections 160 (with the radial direction being defined from the center of the damper stack 122 outwardly, as indicated by arrow 172 in FIG. 7). As such, the diameter 170 of the disk sections 162 may generally correspond to the maximum, outer diameter of the damper stack 122. It should be appreciated that, as shown in FIGS. 6 and 7, each column section 160 defines the same height/diameter 164, 166 and each disk section 162 defines the same height/diameter 164, 166. However, as will be described below, the height/diameters of the column sections 160 and/or the disk sections 162 may be varied across different column/disk sections and/or across the same column/disk section in order to tune the stiffness of the damper stack 122.

Moreover, in several embodiments, the damper stack 122 may be formed from a viscoelastic material, such as a rubber and/or polymeric viscoelastic material. For instance, one example of a suitable viscoelastic material includes the material SORBOTHANE. However, in other embodiments, the damper stack 122 may be formed from any other suitable viscoelastic material. For instance, other suitable viscoelastic materials may include materials having characteristics that contribute to the desired functionality described herein, such as a relatively low Q-factor, a durometer measurement ranging from about 60 durometer to about 80 durometer, minimal creep, temperature-stable material properties, desirable viscoplasticity, low frangibility, resistance to humidity/water environmental factors and/or the ability to be molded/cut/extruded without complicated or expensive processes. Alternatively, the damper stack 122 may be formed from any other suitable material that allows the disclosed vibration dampers 108 to function as described herein. Additionally, in several embodiments, the damper stack 122 may be formed from two or more different materials. For instance, in one embodiment, one or more of the column sections 160 may be formed from a first material (e.g., a first viscoelastic material) and one or more of the disk sections 162 may be formed from a second material (e.g., a second viscoelastic material).

Moreover, the damper stack 122 may generally have a vertical stiffness, a first horizontal stiffness and a second horizontal stiffness, with each directional stiffness being related to the overall stiffness or spring constant of the vibration damper 108 (i.e., k from Equation 1). As such, each directional stiffness may directly impact one of the directional natural frequencies of the payload/damper system 100. For example, the vertical stiffness generally corresponds to the stiffness of the damper stack 122 in the vertical direction (i.e., along the z-axis 154) and, thus, impacts the natural frequency of the payload/damper system 100 in such direction (hereinafter referred to as the "vertical natural frequency"). The first horizontal stiffness generally corresponds to the stiffness of the damper stack 122 in one of the horizontal directions (e.g., along the y-axis 156) and, thus, impacts the natural frequency of the payload/damper system 100 in such horizontal direction (hereinafter referred to as the "first horizontal natural frequency"). Similarly, the second horizontal stiffness generally corresponds to the stiffness of the damper stack 122 in the other horizontal direction (e.g., along the x-axis 158) and, thus, impacts the natural frequency of the payload/damper system 100 in such other horizontal direction (hereinafter referred to as the "second horizontal natural frequency"). Accordingly, by carefully tailoring each directional stiffness of the damper stack 122 the vibration damper 108 may be specifically tuned to dampen the vibrations derived from the vibration source 102.

The vertical stiffness of the damper stack 122 may generally be tuned by adjusting one or more stiffness-related parameters of the stack 122. For example, in several embodiments, the vertical stiffness of the damper stack may be a function of an overall height 174 (FIG. 5) of the stack 122 (i.e., the sum of the heights 164, 168 of the column and disk sections 160, 162) and the diameter 166 of the column sections 160. Specifically, as the height-to-diameter ratio is increased, the vertical stiffness of the damper stack 122 is decreased. Thus, to achieve a low vertical natural frequency, the height-to-diameter ratio must be designed to be relatively high (e.g., 3-to-1).

It should be appreciated by those of ordinary skill in the art that, as the height-to-diameter ratio is increased, a column-shaped damper stack would be subject to significant buckling issues. However, the unique design of the disclosed damper stack 122 (i.e., by having alternating rows of column and disk sections 160, 162) allows for increased height-to-diameter ratios to be achieved without causing buckling of the stack 122. Specifically, when the damper stack 122 is loaded or otherwise compressed, the disk sections 162 may be configured to expand outwardly and contact an inner surface 176 of the cover 126, thereby preventing the damper stack 122 from buckling. For example, FIG. 8 shows a partial, cross-sectional view of the vibration damper 108 shown in FIG. 6 when the damper stack 122 is loaded or compressed. As shown, as the damper stack 122 is compressed (e.g., due to the weight of the payload 104), the disk sections 162 expand outwardly and contact against the inner surface 176 of the cover 126, which results in a reaction force (indicated by arrow 178) at the disk/cover interface that serves to prevent buckling of the damper stack 122. Such a design allows each individual column section 160 to have a relatively low, buckling resistant height-to-diameter ratio. However, taken as a whole, the entire damper stack 122 may have a relatively high height-to-diameter ratio to allow lower vertical natural frequencies to be achieved for the payload/damper system 100.

The horizontal stiffness of the damper stack 12 (i.e., the first horizontal stiffness and/or the second horizontal stiffness) may be primarily a function of the configuration of the top portion of the damper stack 122 (e.g., the top column section 160 and/or the top disk section 162). In particular, due to the fact that the disk sections 162 resist all or a significant portion of the lateral motion of the damper stack 122, the top column section 160 may be subjected to majority of the shear within the damper stack 122. Thus, the configuration of the top column section (e.g., the height 164 and diameter 166 of the top column section 160) may impact the horizontal stiffness of the damper stack 122 significantly. However, as will be described below with reference to FIGS. 9-20, by adjusting various stiffness-related parameters associated with the disk sections 162 (e.g., the location, size, number, spacing and/or cross-sectional profile of the disk sections 162), the first horizontal stiffness and/or the second horizontal stiffness of the damper stack 122 may be fine-tuned to achieved the desired horizontal natural frequencies for the payload/damper system 100. It should be appreciated that, in describing the damper stack configurations shown in FIGS. 9-20, the same reference characters will be used to describe the same/similar components and/or features of the damper stack 122, such as the top surface 150 of the stack 122, the column sections 160, the disk sections 162, the column height 164, the disk height 168, and/or any other suitable components and/or features.

For example, FIG. 9 illustrates a side perspective view of another embodiment of a damper stack configuration suitable for use with the disclosed vibration damper 108. As shown, unlike the embodiment described above, the top surface 150 of the damper stack 122 is defined by a disk section 162 as opposed to a column section 160. By locating a disk section 162 on top of the damper stack, the horizontal stiffness of the stack 122 may be increased significantly (e.g., as compared to the horizontal stiffness of the damper stack 122 shown in FIG. 6). Specifically, due to its increased diameter, the disk section 162 may be configured to accommodate a greater shear force than the column section 160, thereby allowing the horizontal stiffness of the stack 122 to be increased.

As another example, FIG. 10 illustrates a side view of a further embodiment of a damper stack configuration suitable for use with the disclosed vibration damper 108. As shown similar to the embodiment described above with reference to FIGS. 5-7, the top of the damper stack 122 terminates with a column section 160. However, the height 168 of the top disk section 162 has been reduced (e.g., as compared to the height 168 of the bottom disk section 162 shown in FIG. 10 and as compared to the height 168 of the disk sections 162 shown in FIG. 6). As a result, the horizontal stiffness of the damper stack 122 may be increased. It should be appreciated by those of ordinary skill in the art that, by alternatively increasing the height 168 of the top disk section 162, the horizontal stiffness of the damper stack 12 may be decreased.

In addition to the location and size of the disk sections 162, the number and/or spacing of the disk sections 162 may also be varied to fine-tune the horizontal stiffness of the damper stack 122. For instance, FIG. 11 illustrates a side view of yet another embodiment of a damper stack configuration suitable for use with the disclosed vibration damper 108. As shown, the damper stack 122 includes an increased number of disk sections 162 (and, thus, an increased number of column sections 160). For a damper stack 122 having the same overall height 174, this increased number of disk sections 162 may also result in a reduction in the spacing defined between the disk sections 162 (i.e., a reduction in the height 164 of the column sections 160). Such a configuration for the damper stack 122 may generally result in a substantial increase in its horizontal stiffness as well as in its vertical stiffness.

Figure 12:
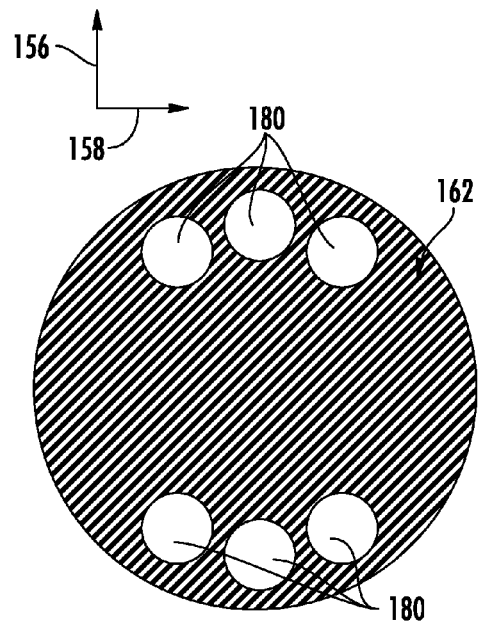
FIG. 12 illustrates a cross-sectional view of one embodiment of a disk configuration in accordance with aspects of the present subject matter.

The cross-sectional profile(s) of the disk sections 162 may also be adjusted to further tune the horizontal stiffness of the stack 122. For instance, FIGS. 12-15 illustrate several examples of suitable horizontal cross-sectional profiles (i.e., a cross-section in the x-y plane, such as along line A-A shown in FIG. 6) that may be utilized to fine-tune the horizontal stiffness of the damper stack 122. As shown in FIG. 12, the disk section 162 includes a plurality of disk openings 180 defined vertically therein. Specifically, in the illustrated embodiment, the disk openings 180 are defined in the disk section 162 at the top and bottom of its cross-section. As a result, the disk section 162 may be softer in a first horizontal direction extending between the openings 180 (e.g., along the y-axis 156) and stiffer in a perpendicular, second horizontal direction (e.g., along the x-axis 158), thereby allowing the damper stack 122 to have a lower horizontal stiffness in the first direction (e.g., the first horizontal stiffness) than in the second direction (e.g., the second horizontal stiffness). In other embodiments, it should be appreciated that the number, size and/or location of the disk openings 180 may be varied in any other suitable manner to alter the horizontal stiffness of the damper stack 122.

Figure 13:
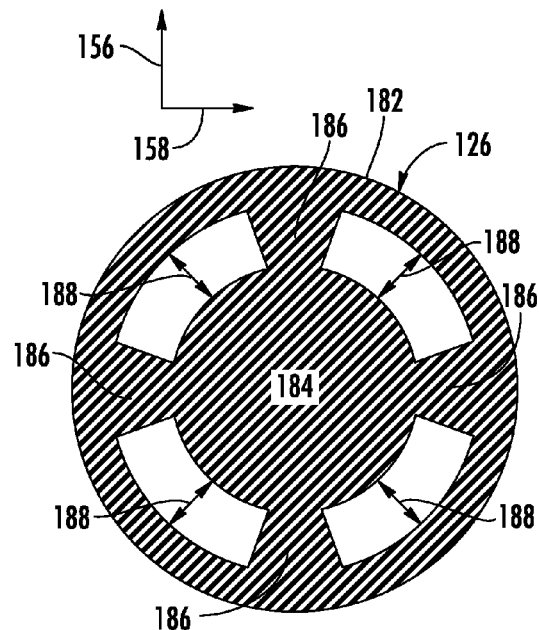
FIG. 13 illustrates a cross-sectional view of another embodiment of a disk configuration in accordance with aspects of the present subject matter.

In the example shown in FIG. 13, the disk section 162 includes an annular ring 182 extending around the outer circumference of the disk section 162, an inner body portion 184 spaced radially inwardly from the ring 182 and a plurality of stiffeners 186 extending between the ring 182 and the inner body portion 184. Each stiffener 186 may generally serve to stiffen the disk section 162 in the direction along which it extends. For example, in the illustrated embodiment, the stiffeners 186 are positioned between the ring 182 and the inner body portion 184 so as to extend radially along the x- and y-axes 158, 156. As a result, the disk section 162 may be stiffer in the x- and y-directions and softer in the directions spaced circumferentially apart from such axes (e.g., in the directions indicated by the arrows 188).

Figure 14:
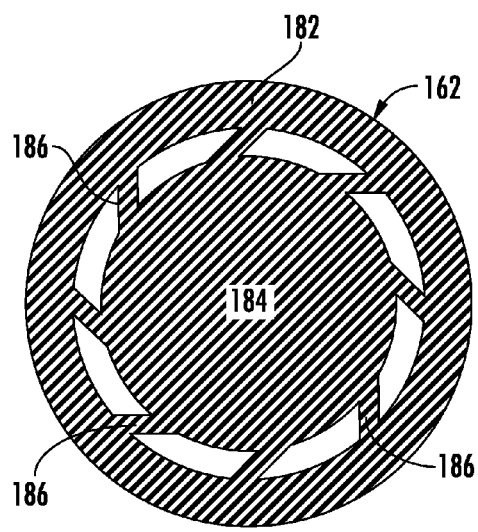
FIG. 14 illustrates a cross-sectional view of a further embodiment of a disk configuration in accordance with aspects of the present subject matter.

In other embodiments, it should be appreciated that the number, size and/or location of the stiffeners 186 may be varied in any other suitable manner to alter the horizontal stiffness of the damper stack 122. For example, FIG. 14 illustrates another example of a disk section 162 including an annular ring 182, an inner body portion 184 and a plurality of stiffeners 186 extending between the ring 182 and the inner body portion 184. As shown, unlike the radially extending stiffeners described above with reference to FIG. 13, the stiffeners 186 shown in FIG. 14 extend between the ring 182 and the inner body portion 184 in a plurality of different directions within the horizontal plane. As a result, the horizontal stiffness of the disk section 162 may vary significantly across such plane. Specifically, such a configuration may allow for an increase in the rotational stiffness of the damper stack 162 in the horizontal plane while allowing for relatively low horizontal stiffness.

Figure 15:
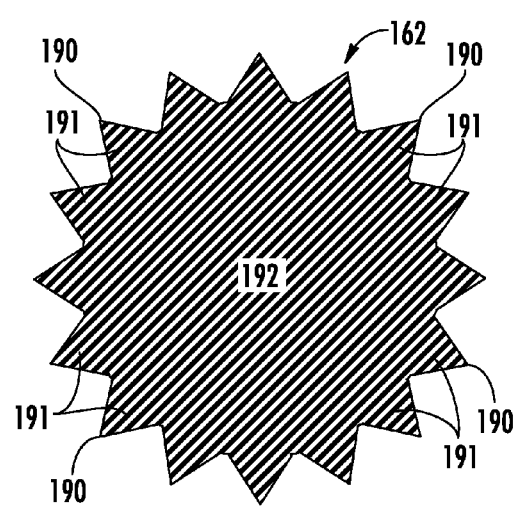
FIG. 15 illustrates a cross-sectional view of yet another embodiment of a disk configuration in accordance with aspects of the present subject matter.

In the example shown in FIG. 15, the disk section 162 is configured such that, when the damper stack 122 is initially loaded or compressed, the disk section 162 contacts the inner surface 176 of the cover 126 at a plurality of contact points 190 spaced apart from one another around the outer circumference of the disk section 162. Specifically, in the illustrated embodiment, the disk section 162 includes a plurality of teeth 191 extending outward from an inner body portion 192 around the outer circumference of the disk section 162, with each tooth 191 terminating at one of the contact points 190. By configuring the disk section 162 as shown in FIG. 15, the damper stack 122 may include a variable horizontal stiffness depending on the amplitude of the vibration experienced by the vibration damper 108. For example, the stiffness of the disk section 162 may be relative low as the teeth 191 are initially compressed between the inner body portion 192 and the inner surface 176 of the cover 126 for relatively small amplitude vibrations. However, with increasing vibration amplitudes, the disk section 162 may exhibit an increased stiffness as the teeth 191 become fully compressed between the inner body portion 191 and the inner surface 176. It should be appreciated that, in alternative embodiments, the disk section 162 may be modified to include any other suitable features (e.g., ridges, channels, etc.) that provide a plurality of spaced apart contact points 190 around the disk's outer circumference.

Figure 16:
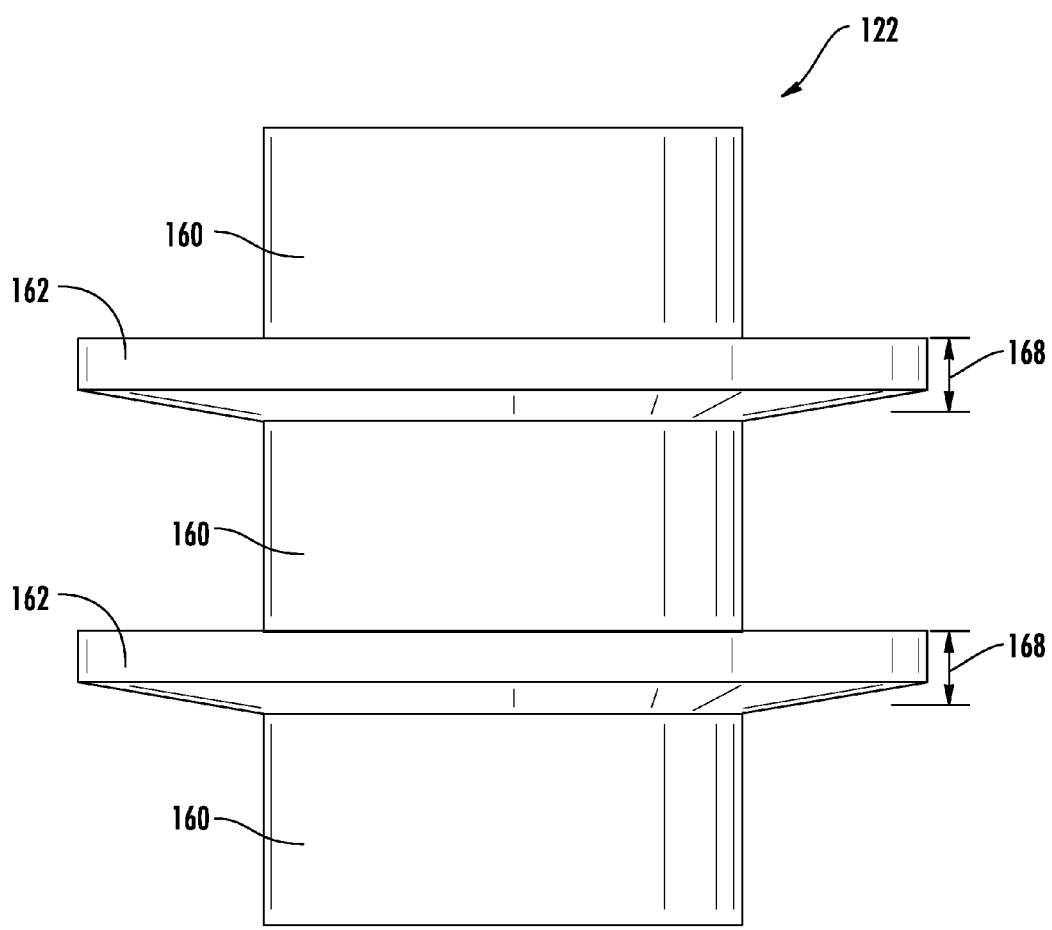
FIG. 16 illustrates a side view of another embodiment of a damper stack configuration in accordance with aspects of the present subject matter.
Figure 17:
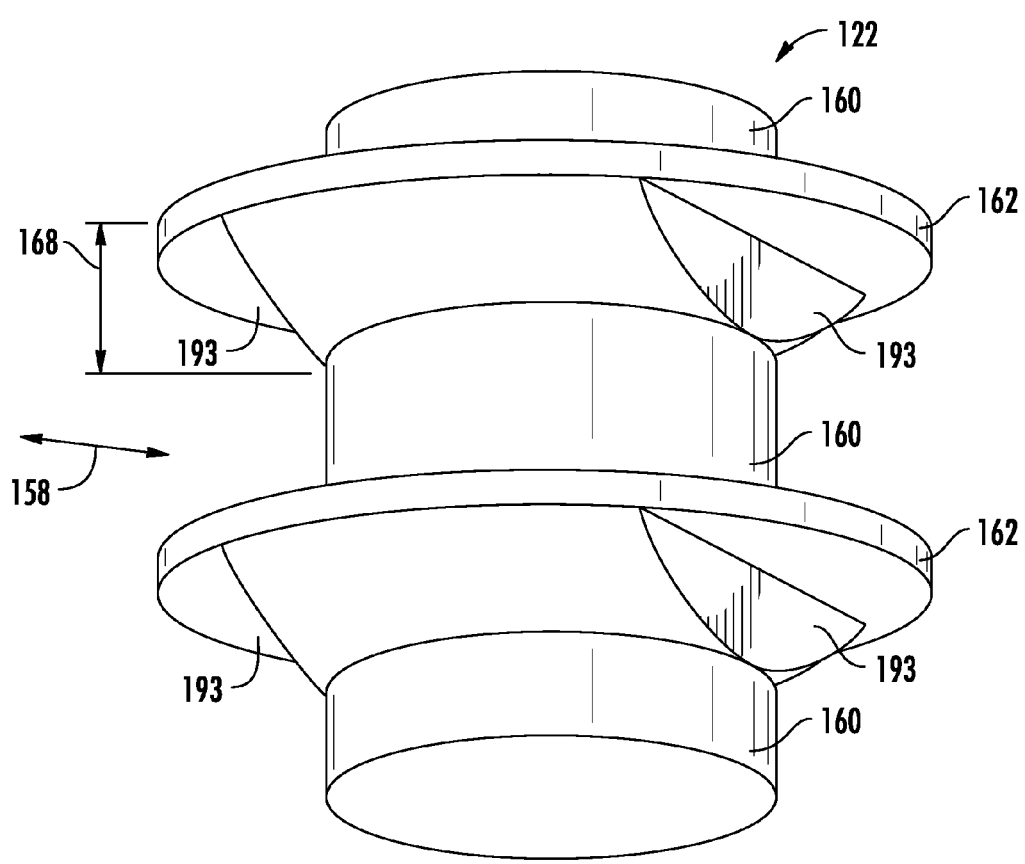
FIG. 17 illustrates a perspective view of a further embodiment of a damper stack configuration in accordance with aspects of the present subject matter.
Figure 18:
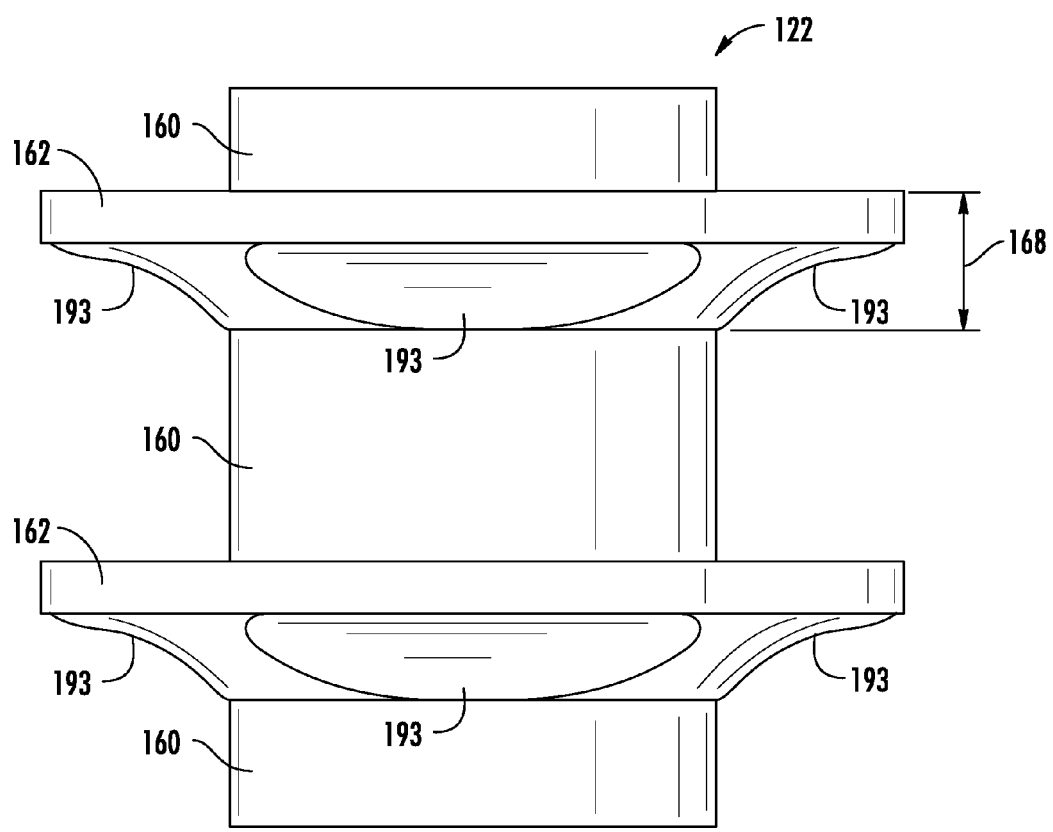
FIG. 18 illustrates a side view of yet another embodiment of a damper stack configuration in accordance with aspects of the present subject matter.

Referring now to FIGS. 16-18, various other examples of how the cross-sectional profile(s) of the damper stack 122 may be adjusted to further tune its horizontal stiffness stack are illustrated in accordance with aspects of the present subject matter. For instance, as shown in FIG. 16, the height 168 of each disk section 162 may be varied as it extends radially outwardly from the outer circumference of the adjacent column sections 160. Specifically, as shown in the illustrated, the disk sections 162 define tapered heights 168 that decrease steadily as each disk section 162 extends radially outwardly. As a result, the stiffness of each disk section 162 may increase with increasing vibration amplitudes.

FIGS. 17 and 18 illustrate variations of the damper stack configuration shown in FIG. 16. As shown, instead of defining a tapered height 168 that is radially symmetrical around the circumference of each disk section 162, the disk sections 162 include one or more radial cut-outs 193 (i.e., areas of reduced height), thereby providing for non-radially symmetric disk heights 168. Specifically, as shown in the embodiment of FIG. 17, the disk sections 162 include cut-outs 193 at locations aligned with a single horizontal axis (e.g., along the x-axis 158). As a result, the stiffness of the damper stack 122 may be significantly lower in such horizontal direction than in the perpendicular horizontal direction (e.g., along the y-axis 156). Similarly, in the embodiment shown in FIG. 18, the disk sections 162 include cut-outs 193 at locations aligned with two perpendicular horizontal axes (e.g., along the x- and y-axes). As a result, the stiffness of the damper stack 162 may be significantly reduced in both horizontal directions.

Figure 19:
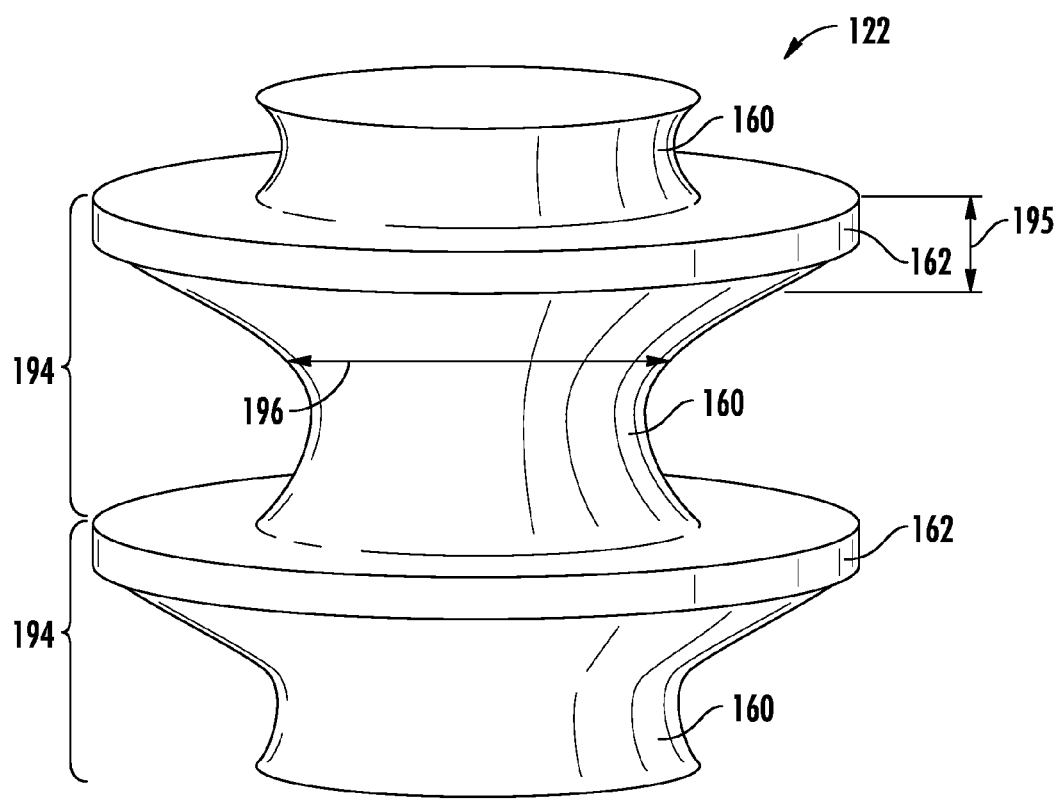
FIG. 19 illustrates a perspective view of an even further embodiment of a damper stack configuration in accordance with aspects of the present subject matter.
Figure 20:
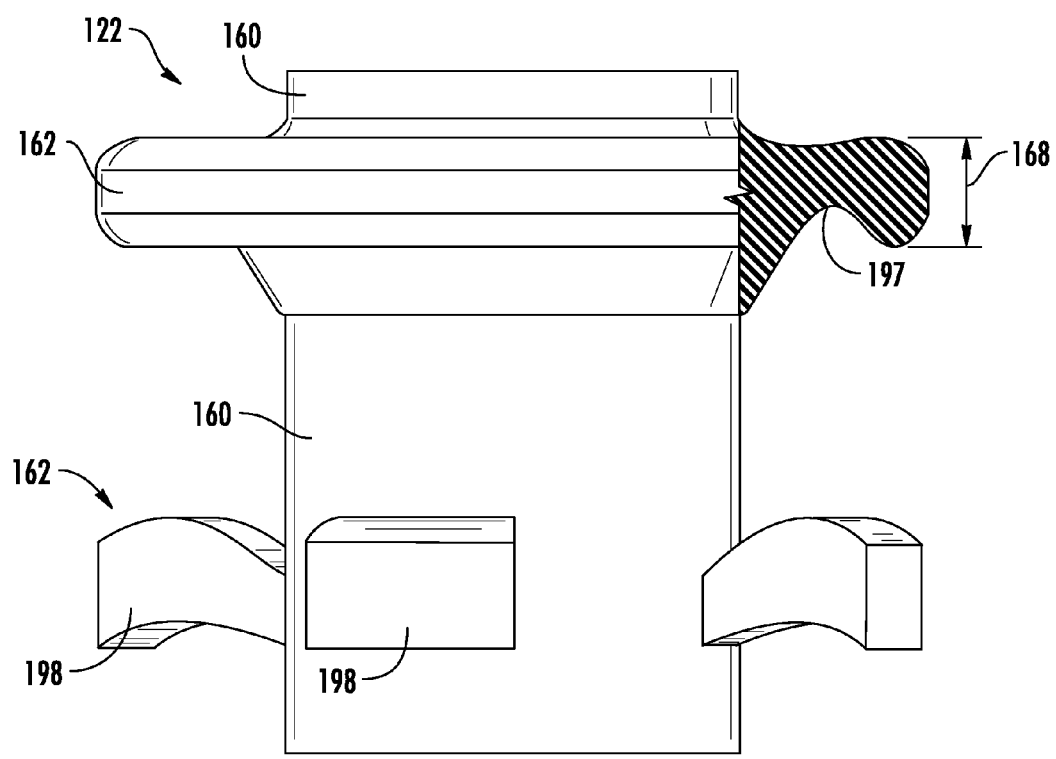
FIG. 20 illustrates a side view of another embodiment of a damper stack configuration in accordance with aspects of the present subject matter, particularly illustrating a portion of the damper stack in cross-section to show the varying height of a top disk section of the damper stack.

Referring now to FIGS. 19 and 20, other suitable configurations that may be utilized to fine-tine the stiffness of the damper stack 162 are illustrated in accordance with aspects of the present subject matter. For example, as shown in FIG. 19, the damper stack 122 includes less distinct column and disk sections 160, 162 extending along the height of the stack 122. Specifically, the damper stack 162 forms a wavy or curved vertical profile, with adjacent column and disk sections 160, 162 being blended together to form damper sections 194 that define continuously changing heights 195 and/or diameters 196. In the embodiment shown in FIG. 20, the damper stack 122 includes a top disk section 162 that defines a relatively complex cross-sectional profile, such as by defining a disk height 168 that decreases as the disk section 162 extends radially from adjacent column sections 160 to an intermediate radial point 197 and then increases from such point 197 to the outer circumference of the disk section 162. Additionally, as shown in FIG. 20, the damper stack 122 includes a bottom disk section 162 formed from a plurality of radially extending legs 198. In such an embodiment, each leg 198 may extend outwardly and contact the inner surface 176 of the housing cover 126, thereby providing additional horizontal stiffness to the damper stack 122 in the specific direction in which each leg 198 extends.

It should be appreciated that the various damper stack configurations described above are simply provided as examples of how one or more of the stiffness-related parameters of the damper stack 122 may be varied in order to tune the stack's vertical and/or horizontal stiffness(es) and, thus, fine-tune the vertical and/or horizontal natural frequency(ies) of the disclosed payload/damper system 100. One of ordinary skill in the art should readily understand that the stiffness-related parameters described herein may be varied in any other suitable manner (including varying such parameter(s) individually or in combination) to provide a different damper stack configuration having unique stiffness characteristics. Thus, by tailoring the configuration of the damper stack 122 to the specific requirements of the payload/damper system 100, the stiffness of the damper stack 122 may be optimized to provide the desired damping characteristics for the system 100.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A tunable vibration damper, comprising:
   a housing;
   a damper stack disposed within the housing, the damper stack having a vertical stiffness and a horizontal stiffness, the damper stack comprising a plurality of column sections and a plurality of disk sections positioned in an alternating arrangement one on top of the other such that each pair of adjacent column sections is separated by one of the disk sections, the disk section defining a radial dimension that is greater than a radial dimension of the column sections, both the column sections and the disk sections being formed from a viscoelastic material,
   wherein at least one of the vertical stiffness or the horizontal stiffness is tunable by adjusting a stiffness-related parameter of the damper stack, and
   wherein the disk sections are configured to contact an inner surface of the cover when the damper stack is compressed and wherein the disk sections are configured to be spaced apart from the inner surface of the cover when the damper stack is not compressed.

2. The tunable vibration damper of claim 1, wherein the vertical stiffness is tunable by adjusting at least one of a height of the damper stack or a diameter of the column sections.

3. The tunable vibration damper of claim 1, wherein the horizontal stiffness comprises a first horizontal stiffness and a second horizontal stiffness.

4. The tunable vibration damper of claim 1, wherein the horizontal stiffness is tunable by adjusting at least one of a size, location, number, spacing or cross-sectional profile of the disk sections.

5. The tunable vibration damper of claim 1, wherein a disk section of the plurality of disk sections defines a top surface of the damper stack.

6. The tunable vibration damper of claim 1, wherein each disk section defines a height, wherein the height of at least one of the disk sections varies from the height of the other disk sections.

7. The tunable vibration damper of claim 1, wherein a height of at least one of the disk sections varies in a radial direction of the damper stack.

8. The tunable vibration damper of claim 1, wherein a cross-sectional profile of at least one of the disk sections is varied such that a first horizontal stiffness of the damper stack differs from a second horizontal stiffness of the damper stack.

9. The tunable vibration damper of claim 1, wherein the housing comprises a base and a cover, the cover being configured to be coupled to the base so as to at least partially encase the damper stack.

10. The tunable vibration damper of claim 9, further comprising a plunger extending from a top surface of the damper stack through an opening defined in the cover.

11. A system for damping vibrations derived from a vibration source, the system comprising:
    a payload;
    at least one vibration damper coupled between the payload and the vibration source, the at least one vibration damper comprising:
       a housing;
       a damper stack disposed within the housing, the damper stack having a vertical stiffness and a horizontal stiffness, the damper stack comprising a plurality of column sections and a plurality of disk sections positioned in an alternating arrangement one on top of the other such that each pair of adjacent column sections is separated by one of the disk sections, the disk section defining a radial dimension that is greater than a radial dimension of the column sections, both the column sections and the disk sections being formed from a viscoelastic material,
       wherein at least one of the vertical stiffness or the horizontal stiffness is tunable by adjusting a stiffness-related parameter of the damper stack, and
       wherein the disk sections are configured to contact an inner surface of the cover when the damper stack is compressed and wherein the disk sections are configured to be spaced apart from the inner surface of the cover when the damper stack is not compressed.

12. The system of claim 11, wherein the vertical stiffness is tunable by adjusting at least one of a height of the damper stack or a diameter of the column sections.

13. The system of claim 11, wherein the horizontal stiffness comprises a first horizontal stiffness and a second horizontal stiffness.

14. The system of claim 11, wherein the horizontal stiffness is tunable by adjusting at least one of a size, location, number, spacing or cross-sectional profile of the disk sections.

15. The system of claim 11, wherein a cross-sectional profile of at least one of the disk sections is varied such that a first horizontal stiffness of the damper stack differs from a second horizontal stiffness of the damper stack.

16. The system of claim 11, wherein the housing comprises a base and a cover, the cover being configured to be coupled to the base so as to at least partially encase the damper stack.

17. The system of claim 16, further comprising a plunger extending from a top surface of the damper stack through an opening defined in the cover, the plunger being coupled to the payload.

18. A system for capturing aerial photography from an airplane, the system comprising:
    a camera;
    at least one vibration damper coupled between the camera and a component of the airplane, the at least one vibration damper comprising;

a housing;

a damper stack disposed within the housing, the damper stack having a vertical stiffness and a horizontal stiffness, the damper stack comprising a plurality of column sections and a plurality of disk sections positioned in an alternating arrangement one on top of the other such that each pair of adjacent column sections is separated by one of the disk sections, the disk section defining a radial dimension that is greater than a radial dimension of the column sections, both the column sections and the disk sections being formed from a viscoelastic material, wherein at least one of the vertical stiffness or the horizontal stiffness is tunable by adjusting a stiffness-related parameter of the damper stack, and wherein the disk sections are configured to contact an inner surface of the cover when the damper stack is compressed and wherein the disk sections are configured to be spaced apart from the inner surface of the cover when the damper stack is not compressed.

* * * * *